United States Patent
Felix et al.

(10) Patent No.: US 12,474,005 B2
(45) Date of Patent: Nov. 18, 2025

(54) DEVICE FOR THE SEALED TRANSFER BETWEEN TWO ENCLOSED VOLUMES, COMPRISING AN EXTERNAL CONTROL LEVER

(71) Applicant: ABC TRANSFER, Tours (FR)

(72) Inventors: Julien Felix, Vendome (FR); Jean-Luc Schneider, Saint Firmin des Pres (FR); Thierry Girard, Paris (FR)

(73) Assignee: ABC TRANSFER, Tours (FR)

( * ) Notice: Subject to any disclaimer, the term of this patent is extended or adjusted under 35 U.S.C. 154(b) by 524 days.

(21) Appl. No.: 17/774,655

(22) PCT Filed: Nov. 5, 2020

(86) PCT No.: PCT/FR2020/052010
§ 371 (c)(1),
(2) Date: May 5, 2022

(87) PCT Pub. No.: WO2021/089952
PCT Pub. Date: May 14, 2021

(65) Prior Publication Data
US 2023/0213130 A1    Jul. 6, 2023

(30) Foreign Application Priority Data

Nov. 5, 2019   (FR) .................................... 1912411

(51) Int. Cl.
*B01L 1/02*         (2006.01)
*F16J 13/18*        (2006.01)
(Continued)

(52) U.S. Cl.
CPC ................. *F16L 37/44* (2013.01); *B01L 1/02* (2013.01); *F16J 13/18* (2013.01); *F16L 37/248* (2013.01);
(Continued)

(58) Field of Classification Search
CPC ...... B01L 1/02; B01L 2300/043; G21F 7/047; F16J 13/18
See application file for complete search history.

(56) References Cited

U.S. PATENT DOCUMENTS 9,704,607 B2 *  7/2017  Chavrot ................. G21F 7/005

FOREIGN PATENT DOCUMENTS

EP  2946833 A1 * 11/2015 ............... F16J 13/18
FR  2998328 A1 *  5/2014 ............... G21F 5/12

OTHER PUBLICATIONS

EP2946833A1 English translation from WIPO (Year: 2015).*
FR2998328 English translation from WIPO (Year: 2012).*

* cited by examiner

*Primary Examiner* — Daniel J Troy
*Assistant Examiner* — Susan M. Heschel
(74) *Attorney, Agent, or Firm* — McDonnell Boehnen Hulbert & Berghoff LLP

(57) ABSTRACT

The invention relates to a device for sealed transfer between two enclosed volumes, comprising a first flange and a second flange (10) which define a passage opening into the enclosed volumes and can be secured to each other by a first bayonet connection, a first door and a second door (11) which close off the passage openings and can be secured to each other by a second bayonet connection, the first door (11) being hingedly mounted on the first flange (10) by means of a hinge (4) comprising a hinge pin, characterized in that the device comprises an external manual control lever (9) which is secured to a rotary pin penetrating the first flange (10) and which is coupled to the hinge pin in such a way that the actuation of the control lever (9) drives the hinge pin, thus opening or closing the first door (11).

13 Claims, 8 Drawing Sheets

(51) Int. Cl.
*F16L 37/248* (2006.01)
*F16L 37/44* (2006.01)
(52) U.S. Cl.
CPC . *B01L 2200/026* (2013.01); *B01L 2200/0689* (2013.01); *B01L 2200/082* (2013.01)

DEVICE FOR THE SEALED TRANSFER BETWEEN TWO ENCLOSED VOLUMES, COMPRISING AN EXTERNAL CONTROL LEVER

CROSS REFERENCE TO RELATED APPLICATION

This application is a U.S. National Phase of International Application No. PCT/FR2020/052010, filed Nov. 5, 2020, which claims priority to French Patent Application No. FR1912411, filed Nov. 5, 2019, both of which are incorporated by reference herein in their entirety.

TECHNICAL FIELD OF THE INVENTION

The invention relates to a sealed transfer device between two enclosed volumes.

In the present application, volume is understood to mean any product, assembly or apparatus that defines a volume. Thus, it can be an enclosure, an insulator, a receptacle, a container, a bag, etc.

Enclosed volume is understood to mean a volume isolated from the external environment. This may be in particular, but not exclusively, a volume for preparing, storing and/or handling products that must not be in contact with the outside or with a user.

The transfer device according to the invention is intended in particular, but not exclusively, to connect two enclosed volumes in order to transfer products from one volume to the other without breaking the containment. This may include, for example, the transfer of hazardous products such as certain biological, chemical or radioactive products, the transfer of components such as stoppers, vials, plungers, syringes, etc., the transfer of environmental control devices such as culture medium plates, particle counters, etc., the transfer of cleaning systems, the transfer of liquids, powders, tools, the transfer of waste to the outside of the enclosure and/or the transfer of any element necessary to production or maintenance of the production line.

PRIOR ART

The sealed devices for the transfer between two enclosed volumes conventionally themselves comprise two flanges each defining a passage opening into the enclosed volumes, each of the passage openings being closed off by a door. The flange and door of one of the enclosed volumes are capable of being connected respectively to the flange and to the door of the other enclosed volume by a bayonet connection and of being secured to each other under the action of a rotational movement of the one of the flanges and associated door with respect to the flange and door to which they are attached.

The sealed transfer devices further comprise control members for opening and closing the two doors that are attached and secured to each other. The control members, which are movably mounted on one of the flanges, can be operated from inside one of the volumes using remote control means such as teleoperators or gloves.

In order to limit interventions within the enclosed volumes, which can contain a toxic environment, and thus to reduce the risks for the operator, manually actuable control mechanisms intended for opening and closing the double doors and arranged outside the enclosed volumes were provided. By way of example, patent application FR2998328 may be cited, which relates to a sealed enclosure including an opening made in the wall of the enclosure, a flange fastened in an opening, an access door closing off the opening, said door being hinged to the flange by a hinge, and a control mechanism comprising a sliding rack and pinion system driven by a wheel, the pinion being secured to a movable element of the hinge so that the movement of the rack in one direction or in the other according to the direction of rotation of the wheel causes the door to open or close. Such a control mechanism, however, has the disadvantage of making opening and closing the door cumbersome, difficult and non-instantaneous, requiring several turns of rotation of the wheel to fully open or close the door.

Motorized mechanisms that can be actuated remotely are also known. However, such mechanisms have the drawback of making the transfer devices more complex. They also have drawbacks in terms of maintenance and bulk, in particular when the motors are arranged inside enclosed volumes.

The invention aims to overcome these difficulties by providing a sealed transfer device between two enclosed volumes for which the opening and closing of the double door can be controlled simply, reliably and quickly, without risk of breaking the seal and without risk to the operator.

The invention also aims to provide a transfer device that needs less effort to open the double door.

SUBJECT MATTER OF THE INVENTION

To this end, and according to a first aspect, the invention provides a sealed transfer device between two enclosed volumes, comprising a first and a second flange which define a passage opening into the enclosed volumes, it being possible for said first and said second flange to be secured to each other by a first bayonet connection, a first and a second door closing off the passage openings, it being possible for said first and said second door to be secured to each other by a second bayonet connection, the first door being hingedly mounted on the first flange by means of a hinge, said hinge comprising a hinge pin and a plate that is fastened to the first door and secured to said hinge pin. The transfer device is characterized in that it includes an external manual control lever secured to a rotary pin which passes through the first flange and is coupled to the hinge pin in such a way that the actuation of the control lever drives the hinge pin, thus opening or closing the first door.

Advantageously, the rotary pin extends in parallel with the passage opening axis.

According to a particular configuration, the sealed transfer device includes a second rotational pin, which is advantageously offset with respect to the rotary pin and is coupled by drive means to the rotary pin that passes through the first flange on one hand and to the hinge pin on the other hand.

According to one embodiment, the transfer device includes a member for locking the second flange to the first flange when the two—first and second—doors, joined together, are in the open position, said member being provided at the hinge. Advantageously, the locking member includes an oblong hole receiving the second rotational pin on one hand, and includes a locking finger extending toward the passage opening, said locking member being translatable in a direction perpendicular to the rotational pin of the hinge, between a position in which the finger is recessed within the first flange and a position for locking the flanges together in which the finger projects radially from the first flange.

The sealed transfer device may also comprise a control mechanism including a control member mounted on the first flange so as to be movable between a position for closing and a position for opening the first and the second door, the control member being located diametrically opposite the hinge, a first blocking member blocking said control member in the absence of the second door and a second blocking member blocking said control member in the absence of the flange associated with the second door.

Advantageously, said first blocking member is radially movable between a blocking position in which it has a peripheral end engaged in a blocking bore in said control member and a release position in which said peripheral end is disengaged from the blocking bore, said first blocking member being moved by a lug of the bayonet system of the second door.

Advantageously, the control member is secured to a rotational pin mounted through an eccentric hole provided in the second blocking member.

Advantageously, the second blocking member is radially movable between a blocking position in which the eccentric hole blocks the rotation of said control member and a release position in which the eccentric hole is moved to allow rotation of the control member, said first member being moved by a lug of the bayonet system of the second flange.

The transfer device may also include a member for locking the second door to the first door when the first and the second door are in the open position, said locking member being integrated into the first door, the member for locking the second door to the first door including a locking finger which extends toward the passage opening and is radially movable between a position in which it is recessed within the first door and a position for locking the doors together in which it projects radially from the first door.

Advantageously, the control member is movable about an axis tangential to the circumference of said first flange, between a closing position where said member forms an angle α with the transverse plane of the flange, and an opening position where said member forms an angle β greater than the angle α with the transverse plane and causes the coupled doors to open.

BRIEF DESCRIPTION OF THE DRAWINGS

Other features and advantages of the invention will become apparent from the following detailed description of the invention with reference to the appended drawings, in which.

For greater clarity, identical or similar elements of the various embodiments are denoted by identical reference signs in all of the figures.

In the following, the terms "inside" or "internal" in relation to an enclosed volume mean that which is in or directed toward the inside space of the enclosed volume. Similarly, the terms "outside" or "external" in relation to an enclosed volume mean that which is located outside the inside space of the enclosed volume or directed away from the inside of the enclosed volume.

DETAILED DESCRIPTION OF THE INVENTION

In relation to FIGS. 1 to 5c, a sealed transfer device between two enclosed volumes is described. According to a particular embodiment, the first enclosed volume is an enclosure while the second enclosed volume is a container. This is of course one embodiment, the device according to the invention not being limited to this type of enclosed volume.

Figure 1:
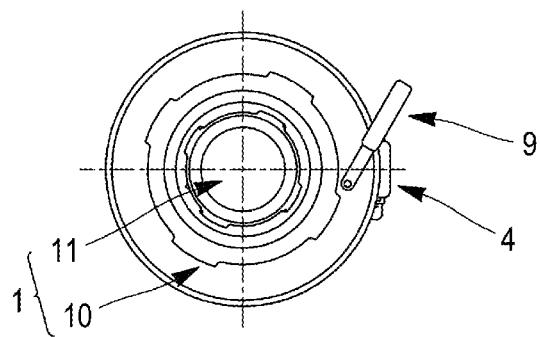
FIG. 1 is a front view from the outside of the first enclosed volume of the sealed transfer device according to one embodiment.

The depicted transfer device comprises a first assembly 1, shown in FIG. 1, including a first flange 10 which defines a passage opening into a first enclosed volume (not shown), and a first door 11 which closes off the passage opening defined by the first flange 10. The first door 11 is joined together with the flange 10 by a hinge 4. The transfer device further comprises a second assembly, not shown, including a second flange which defines a passage opening into a second enclosed volume, and a second door which closes off the passage opening defined by the second flange.

The first flange 10 and the first door 11 of the first volume will subsequently be referred to as the alpha flange 10 and the alpha door 11 and the second flange and the second door of the second volume as the beta flange and the beta door.

Conventionally, the alpha and beta flanges are capable of being secured to each other by a first bayonet-type connection. Similarly, the alpha and beta doors are capable of being secured to each other by a second connection, for example of the bayonet type. To do this, the flanges and doors are respectively provided with internal or external notches and lugs.

The alpha door 11 is hingedly mounted on the alpha flange 10 by means of a hinge 4. In the depicted embodiment, the hinge 4 comprises a hinge pin 40 and a plate 48 which is fastened to the internal face of the alpha door 11 and is secured to the hinge pin 40.

According to the invention, the transfer device includes an external manual control lever 9. External control lever is understood to mean a lever located outside the enclosed volume.

Figure 2:
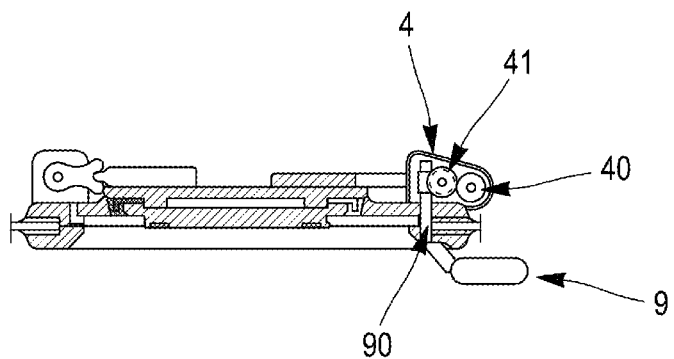
FIG. 2 is a sectional view along the line II-II of the sealed transfer device from FIG. 1.
Figure 3:
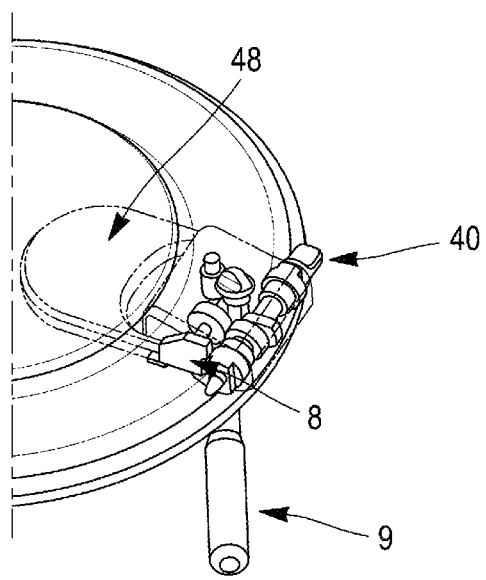
FIG. 3 is a detailed perspective view of the hinge assembly of the sealed transfer device from FIG. 1.
Figure 4:
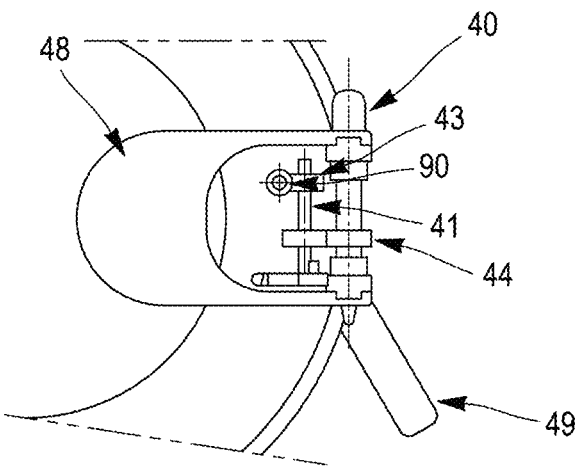
FIG. 4 is a detailed view, from inside the volume, of the hinge assembly of the sealed transfer device from FIG. 1.

The control lever 9 is secured to a rotary pin 90 mounted through the alpha flange 10. In the example depicted, the rotary pin extends in parallel with the passage opening axis. This rotary pin 90 is coupled to the hinge pin 40 via a second rotational pin 41 and drive means 43. As can be seen in FIGS. 2 and 4, the rotational pin 41 is offset with respect to the rotary pin 90. More particularly, and according to a particular configuration, the rotary through-pin 90 is coupled to the second rotational pin 41 by means of a wheel/worm or bevel gear transmission. Similarly, the hinge pin 40 is coupled to the second rotational pin 41 by means of a pinion, a chain or a belt.

Thus, when the control lever 9 is actuated following a rotational movement parallel to the passage opening axis, rotating the rotary pin 90 on which said lever is mounted, said rotary pin drives the second rotational pin 41 by means of the drive means 43, which in turn transmits the rotational movement to the hinge pin 40 via the drive means 44 provided between the second rotational pin 41 and the hinge pin 40. Said hinge pin then drives the plate 48 fastened on the alpha door 11, thus opening said door. The alpha door will be closed in the same way by actuating the control lever in reverse rotation.

Advantageously, the transfer device includes a locking member 8 having the function of interlocking the beta flange with the alpha flange 10 when the doors of the two enclosed volumes are connected together and placed in the open position inside the enclosure. Said device thus forms what is referred to as a means for securing, in an anti-unlocking manner, the open-door beta flange.

Figure 5A:
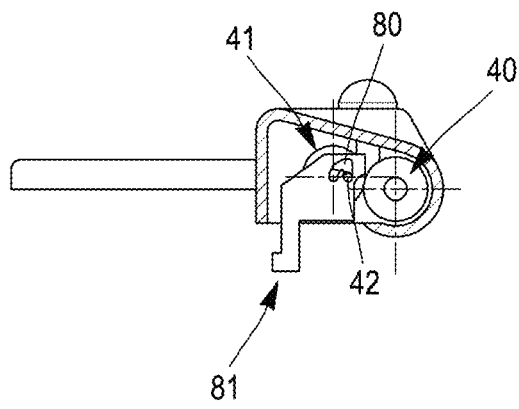
FIG. 5a is a cross-sectional view of the securing mechanism in a position for locking the flange of the second volume.
Figure 5B:
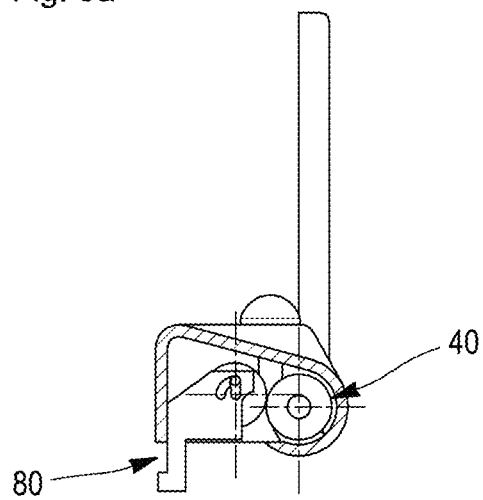
FIG. 5b is a cross-sectional view of the securing mechanism from FIG. 5a in a position for unlocking the flange of the second volume.
Figure 5C:
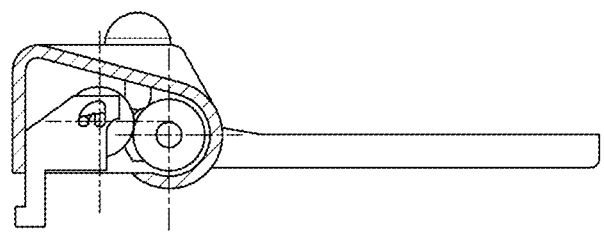
FIG. 5c is a cross-sectional view of the securing mechanism from FIG. 5a in a position for locking the flange of the second volume.
Figure 6:
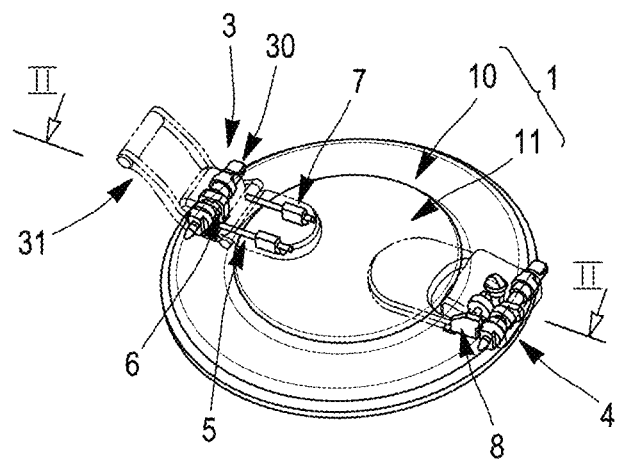
FIG. 6 is a perspective view from the inside of the first enclosed volume of the sealed transfer device according to another embodiment.
Figure 6A:
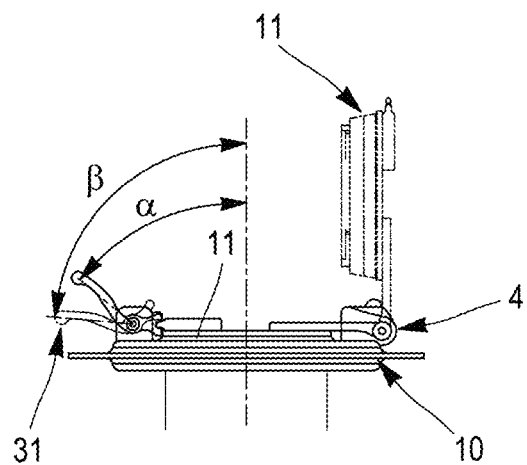
FIG. 6a is a view from above of the closure assembly from FIG. 6.

In the embodiment depicted in FIGS. 5a to 5c, the locking member 8 includes a hole 80 through which an end peg 42 passes which is supported the second rotational pin 41. Said locking member further comprises a finger 81 directed toward the passage opening. This locking member is translatable within the movable flange so as to move from a position in which the finger is fully retracted within the alpha flange and a locking position in which the member is translated such that the finger projects from the internal surface of the alpha flange 10.

Thus, when the alpha door 11 of the enclosure is closed and in the absence of the beta part (beta door and beta flange), the locking member 8 is placed in such a way that the finger 81 does not project relative to the internal surface of the alpha flange 10. When the beta part is docked on the enclosure and fastened to said enclosure, the alpha and the beta flange are locked together by actuating the control lever 9. When the doors are opened by actuating the control lever 9, the rotary pin 90 rotates the second rotational pin 41 via the drive means 43. During the rotation of the second rotational pin, the peg 42 translates the locking member in order to position the finger 81 in the notch in the flange of the beta door so as to block the rotation of the beta flange by abutment of an external lug of the beta flange against the finger 81.

FIGS. 6 to 9c depict another embodiment of a transfer device. Said device has the same features of the transfer device previously described relating to opening the alpha door from the outside by the arrangement of the external control lever 9/the rotary pin 90/the second secondary pin 41/the hinge pin 40 as well as the presence of a means for securing, in an anti-unlocking manner, the beta flange relative to the alpha flange during the opening of the alpha and the beta door.

The transfer device according to this embodiment additionally includes a control member 3 mounted on the alpha flange 10 so as to be movable between a closing position in which the alpha door 11 sealingly closes off the passage opening defined by the alpha flange 10, and a position for opening the alpha door 11 and the beta door. In the depicted embodiment, the control member 3 is an internal opening handle 31 of the alpha door 11, which handle can be activated manually and is rotatably mounted about a pin 30, which is arranged diametrically opposite the hinge 4 and is located advantageously tangentially to the circumference of the alpha flange 10, between a closing position where said member forms an angle α with the transverse plane of the flange, and an opening position where said member forms an angle β with the transverse plane, the angle β being greater than the angle α. The control member 3 and the hinge 4 are supported by the alpha flange 10.

The transfer device according to this embodiment also includes additional securing means relating to the joint opening of the alpha and the beta door of the two connected volumes and the placing in communication of the inside of each of said volumes.

Thus, the transfer device includes a set of securing mechanisms comprising two members for blocking the control member 3 and two members for locking the doors and flanges together. Thus, said device comprises a first blocking member 5 which blocks the control member 3 in the absence of the beta door 21, a second blocking member 6 which blocks said control member 3 in the absence of the associated beta flange 20, a first locking member 7 which interlocks the beta door 21 with the alpha door 11, and a second locking member 8 which interlocks the beta flange 20 with the alpha flange 10 when the two joined-together doors 11, 21 are open.

The blocking member 5 and the locking member 7 are integrated into the alpha door 11 while the blocking member 6 is located in the control unit and the locking member 8 is located in the hinge 4. The operation of these securing means is described below.

Figure 7A:
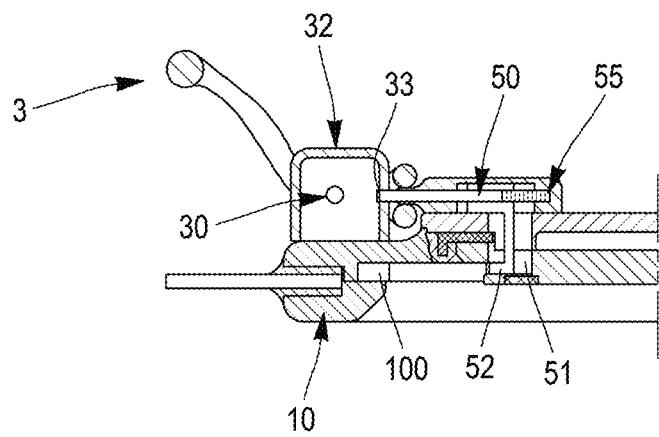
FIG. 7a is a cross-sectional view of the mechanism for the presence of the door of the second volume when the second volume is joined together with the first volume, the door of the first volume being in the locked position.
Figure 7B:
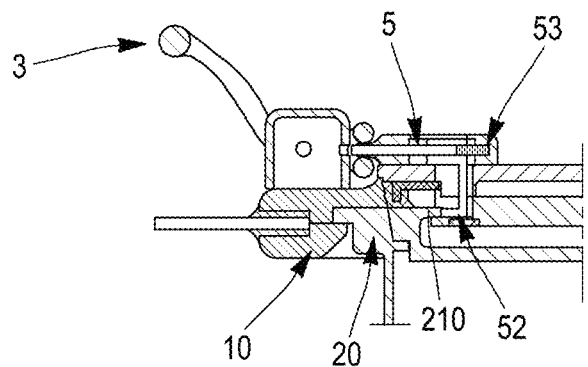
FIG. 7b is a cross-sectional view of the mechanism from FIG. 7a, the door of the first volume being in the unlocked position.
Figure 7C:
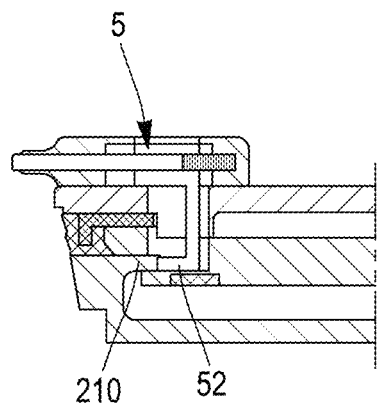
FIG. 7c is an enlarged view of the mechanism from FIG. 7b.

First Securing Means: Blocking Member 5 (FIGS. 7a, 7b, 7c)

The first blocking member 5 has the function of blocking the control member 3 in the closing position while the beta door 21 is not locked to the alpha door 11. Said first blocking member thus forms what is referred to as a means for securing the presence of the beta door 21 on the alpha door 11.

This first blocking member 5 is a lock integrated into the alpha door 11. Said member includes an upper finger 50 and a lower finger 52, which fingers are parallel to each other, extend in parallel with the plane of the alpha door 11, and are connected to each other by a joining wall. The blocking member 5 is mounted so as to slide radially, i.e., perpendicularly to the axis of the passage opening defined by the alpha flange and to the rotational pin 30 of the control member 3, in a cavity 51 provided in the alpha door 11, under the action of and against a return means, here a compression spring 55. The blocking member 5 is thus movable between a blocking position in which the blocking finger 50 is engaged in a blocking bore 33 provided in the housing 32, which is supported by the alpha flange 10 and in which is housed the pin 30 to which the control member 3 is coupled, and a release position in which the blocking finger 50 is disengaged from the blocking bore 33. In the absence of the container, the control member 3 is blocked in the closing position by the blocking finger 50 engaged in the blocking bore 33 (FIG. 7a). When the container is docked on the enclosure, the beta flange 20 and the beta door 21 are respectively brought into contact with the alpha flange 10 and the alpha door 11 of the enclosure, the external lugs 200 of the beta flange 20 being placed in the notches 100 in the alpha flange 10. The operator then turns the beta part (beta door and flange) clockwise (rotation of approximately 60 degrees) into the alpha part (alpha door and flange) until coming into contact with a stop 14 of the alpha flange 10. The beta flange 20 is then blocked in translation by the alpha flange 10. The beta door 21 is unlocked from the beta flange 20 and interlocked with the alpha door 11. During the rotational movement for connecting the beta part to the alpha part, one of the internal lugs 210 of the beta door 21 pushes the lower finger 52 of the blocking member 5, which has the effect of moving said finger into the cavity 51, against the action of the compression spring 55 and away from the alpha flange 10. The blocking member 5 carries along in its movement the finger 50, which then disengages from the blocking bore 33 in the block 32. Once said finger is released, the control member 3 can then be actuated to open the alpha and the beta door which are locked together. The locking together of the doors will be described later.

Figure 8A:
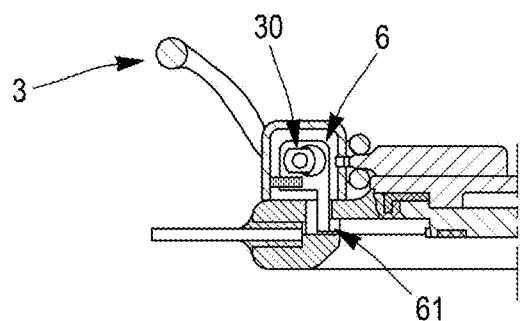
FIG. 8a is a cross-sectional view of the securing mechanism for detecting the presence of the flange of the second volume when said second volume is joined together with the first volume, the door of the first volume being in the locked position.
Figure 8B:
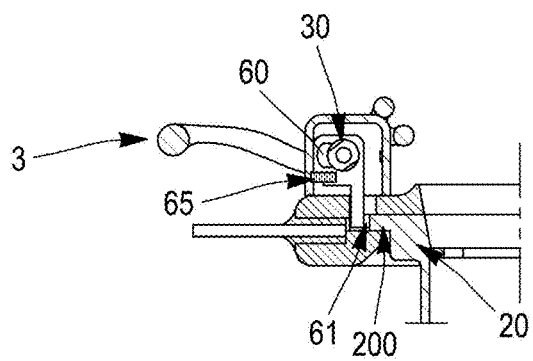
FIG. 8b is a cross-sectional view of the securing mechanism from FIG. 8a, the door of the first volume being in the unlocked position.

Second Securing Means: Blocking Member 6 (FIGS. 8a, 8b)

The second blocking member 6 has the function of blocking the control member 3 in the closing position while the beta flange 20 is not completely secured to the alpha flange 10. Said blocking member thus forms what is referred to as a means for securing the presence of the beta flange 20 on the alpha flange 10.

The second blocking member 6 acts as a latch. Its particular shape allows the opening to be mechanically blocked if the presence of beta flange 20 is not observed.

More particularly, the blocking member 6 includes an eccentric hole 60 (in the example depicted, hole having two parallel and offset opening axes) receiving the rotational pin 30 of control member 3. The blocking member 6 also includes a finger 61 extending so as to project from alpha flange 10. This blocking member 6 is mounted in the housing 32 so as to be able to slide radially, i.e., perpendicularly to the axis of the passage opening defined by the alpha flange 10, under the action of and against a compression spring 65. Said blocking member is movable between a blocking position in which the eccentric hole 60 blocks the rotational movement of the pin of the control member 3 (FIG. 8a) and a release position in which the eccentric hole is moved toward the external circumference of alpha flange 10, to allow rotation of the rotational pin 30 to which the control member 3 is connected (FIG. 8b).

In the absence of the container, the rotational pin 30 passes through the part of the hole 60 blocking the rotational movement of said pin, and thus blocking the control member 3 in the closing position. When the container is docked on the enclosure, the beta flange 20 and the beta door 21 are brought into contact with the alpha flange 10 and the alpha door 11, the external lugs 200 of the beta flange 20 being placed in the notches 100 in the alpha flange 10. The beta part is then connected to the alpha part by turning the beta part into the alpha part clockwise (rotation of approximately 60 degrees) until coming into contact with a stop 14 supported by the alpha flange 10. The beta flange 20 is then blocked in translation by the alpha flange 10. During the rotational movement for connecting the beta part to the alpha part, the external lug 200 of the beta flange 20 pushes the finger 61 of the second blocking member 6, which has the effect of moving the blocking member 6 radially, toward the outside of alpha flange 10, and therefore of moving the hole 60 relative to the rotational pin of control member 3 into the position in which the rotational pin 30 of control member 3 is released (FIG. 8b).

The advantage of providing these two blocking members 5, 6 is to provide double securing means in terms of opening the connected doors, it being possible for said doors to be opened only if the beta flange 20 and the beta door 21 are respectively well connected to the alpha flange 10 and the alpha door 11 of the enclosure. These two blocking members are thus means for securing the presence of the beta door and the beta flange on the associated alpha part.

Third Securing Means: Locking Member 7 (FIGS. 9a to 9d)

Figure 9A:
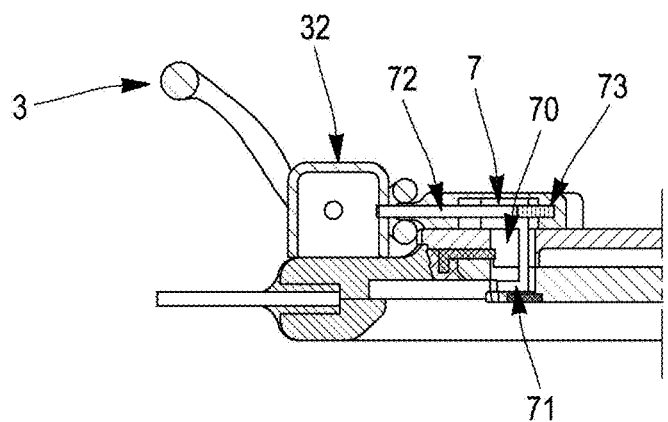
FIG. 9a is a cross-sectional view of the securing mechanism for interlocking the door of the second volume with the door of the first volume, the mechanism being in the unlocked position.
Figure 9B:
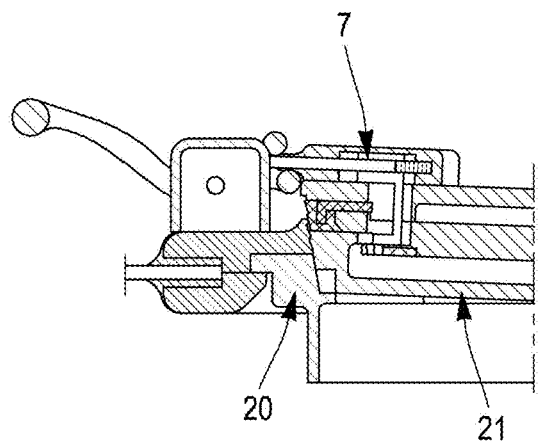
FIG. 9b is a cross-sectional view of the securing mechanism from FIG. 9a, the mechanism being shown while the doors are in the process of being opened.
Figure 9C:
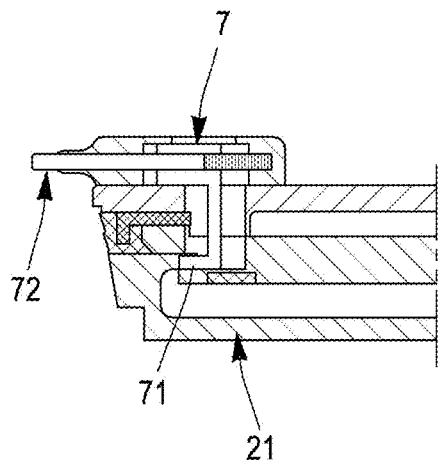
FIG. 9c is an enlarged view of the securing mechanism from FIG. 9a, the mechanism being shown in the position for locking the doors together.
Figure 9D:
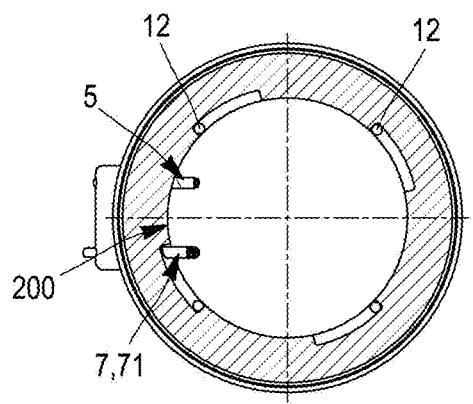
FIG. 9d is a longitudinal sectional view of the securing mechanism from FIG. 9c, the mechanism being in the position for locking the doors together.
Figure 10:
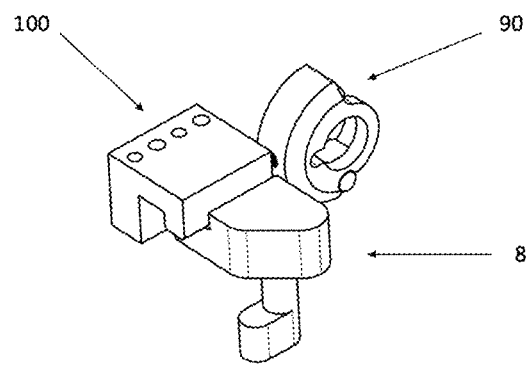
FIG. 10 is a perspective view from above of an alternative embodiment of the securing mechanism for locking the flange of the second volume when the second volume is joined together with the first volume and the door of the first volume in the open position.
Figure 11:
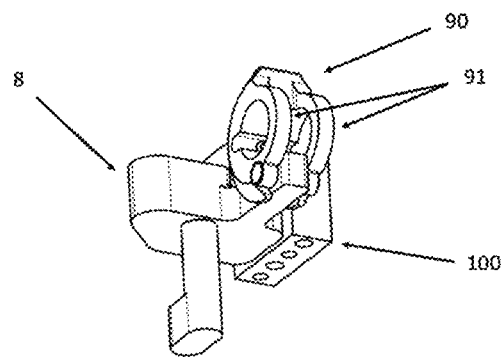
FIG. 11 is a perspective view from below of the securing mechanism from FIG. 10.

The locking member 7 has the function of interlocking the beta door 21 with the alpha door 11 when the control member 3 moves to the position for opening the doors. The locking member 7 includes a lower finger 71 and an upper finger 72, which fingers are parallel to each other, extend perpendicularly to the plane of the alpha door 11, and are connected to each other by a joining wall. The lower finger 71 forms a locking finger (also denoted by reference sign 71) capable of moving from a position in which it is recessed within the alpha door 11 and a locking position in which it projects radially from the alpha door 11. The locking member 7 is mounted so as to slide radially into a cavity 70 within the alpha door 11 against and under the action of a compression spring 73. When the control member 3 is in the closing position, the locking member 7 is held in abutment against the housing 32 via the upper finger 72 under the action of the compression spring 73 (FIG. 9a). When the control member 3 moves into the position for opening the doors, the alpha door 11 carries along in its rotational movement the upper finger 72, which disengages from the housing 32 (FIGS. 9b and 9c). When the upper finger 72 is completely disengaged, the locking member 7 is pushed by the compression spring toward the outside of the door, moving the locking finger 71 into the notch in the beta door 21. Since the beta door 21 is blocked by placing an internal lug 210 of the beta door 21 in abutment between the lower finger 71 and an abutment 12 supported by the alpha door 11, said beta door can then no longer rotate with respect to the alpha door 11 (FIG. 9d). FIGS. 9a to 9c show the movement of the locking member 7 during the transition of the locking member 7 from its position for closing the doors (FIG. 9a) to its position for opening the doors (FIG. 9c), depicting an intermediate position (FIG. 9b).

Fourth Securing Means: Locking Member 8 (FIGS. 5a to 5c, Alternative FIGS. 10 to 12b)

The locking member 8 has the function of interlocking the beta flange 20 with the alpha flange 10 when the doors are open inside the enclosure. Said locking member is combined with the pin 40 of the hinge 4. It forms what is referred to as a means for securing, in an anti-unlocking manner, the open-door beta flange 20.

This locking member 8 includes a hole 80 through which a peg 42 passes which is supported a second rotational pin 41 coupled to the pin 40 of the hinge 4 by drive means 43, 44 (cams in the example depicted). The second rotational pin 41 is also coupled to a third pin 45 which passes through the alpha flange 10 and which can be actuated by an external lever (not shown) so as to allow the alpha door 11 to open.

The locking member 8 includes a finger 81 facing the inside of the passage opening. Said locking member is translatable toward the inside of the passage opening of the alpha flange 10, perpendicularly to the rotational pin 40 of the hinge 4.

When the alpha door 11 is closed, the locking member 8 is placed such that the finger 81 is recessed relative to the internal surface of the alpha flange 10. When the doors are opened by actuation of the external lever, the third pin 45 rotates the second rotational pin 41 via the drive means 43. During the rotation of the second pin 41, the peg 42 slides along the hole 80 which is arranged to translate the locking member 8 and to position the finger of said locking member in the notch in the beta flange 20. Since the beta flange 20 is blocked by placing one of the external lugs 200 of the beta flange 20 in abutment against the finger 81 of the locking member and by a stop 14 of the alpha flange 10, said beta flange can then no longer rotate with respect to the alpha flange 10. In the previously described method, the opening of the doors is actuated by an external lever. It is of course clear that this is one embodiment, and that the hinge could be unconnected to an external lever (in this case the hinge would lack a third rotational pin). The door would then be opened manually, by pulling the alpha door from the inside, after releasing the control member 3.

FIGS. 10 to 12b show an alternative embodiment for interlocking the beta flange 20 with the alpha flange 10 when the doors are open inside the enclosure.

In this alternative, the locking member 8 is connected to the pin 40 of the hinge 4 by a cam, which is fixedly mounted about the pin. The cam 90 has a first profile of claws 91 arranged to come under stress onto a peg 82 supported by the locking member 8 and thus to translate said locking member toward the passage opening during actuation of rotation in one direction (clockwise in the example depicted). The cam 90 also has a second profile 92 arranged to block the peg 82, and therefore for the translation of the locking member 8 when the alpha door 11 is in the closed position. Advantageously, the locking member 8 is guided in translation in a guide rail 100.

Figure 12:
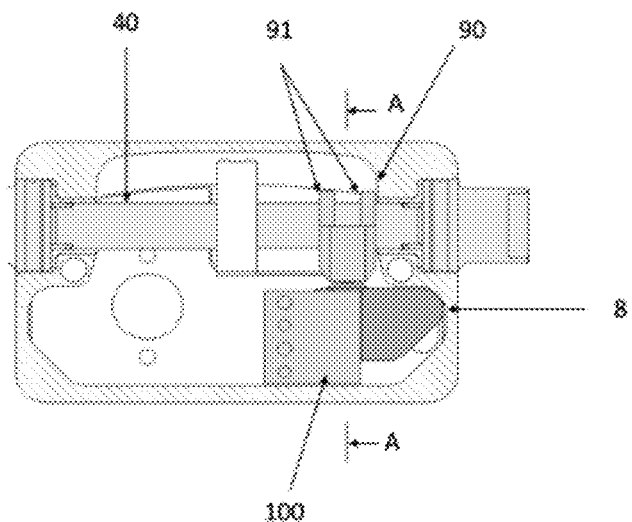
FIG. 12 is a cross-sectional view of the securing mechanism from FIG. 10 combined with the hinge pin.
Figure 12A:
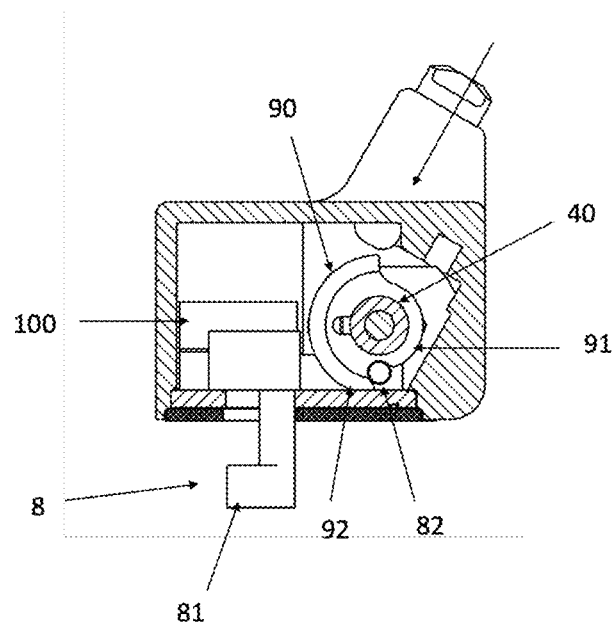
FIG. 12a is a cross-sectional view along the axis AA of the assembly depicted in FIG. 12 in a position for unlocking the flange of the second volume.
Figure 12B:
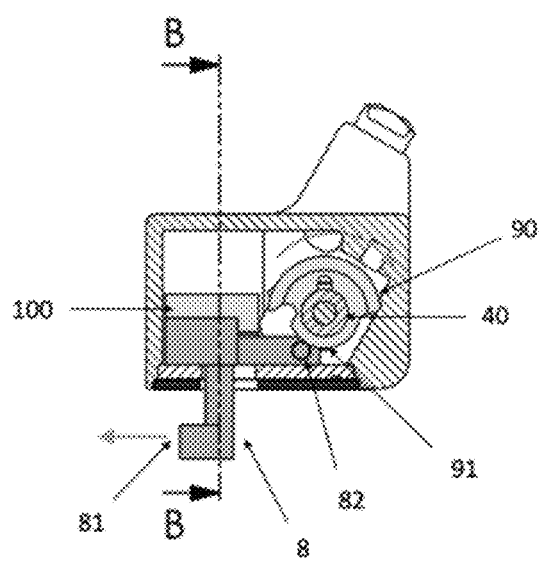
FIG. 12b is a view of the assembly from FIG. 12a in a position for locking the flange of the second volume.

Thus, when the alpha door 11 is closed, the locking member 8 is placed such that the finger 81 is recessed relative to the internal surface of the alpha flange 10 while the cam 90 is in the position for blocking the peg 82 via the second profile 92 (FIG. 12a). When the doors are opened, the pin 40 of the hinge 4 rotates in the clockwise direction, as depicted in FIG. 12b, rotating the cam 90 and thereby putting the peg 82 under stress via the profile of claws 91 of the cam. Since the locking member 8 is pushed by the cam 90, said locking member translates along the guide rail, in a manner guided by the guide rail 100, toward the passage opening, so as to position the finger 81 in the notch in the beta flange 20.

The invention is described above by way of example. It is understood that a person skilled in the art is in a position to produce various alternative embodiments of the invention without thereby departing from the scope of the invention.

The invention claimed is:

1. A sealed transfer device between two enclosed volumes, comprising
   a first and a second flange which define a passage opening into the enclosed volumes, it being possible for said first and said second flange to be secured to each other by a first bayonet connection, and
   a first and a second door which close off the passage openings, it being possible for said first and said second door to be secured to each other by a second bayonet connection,
   the first door being hingedly mounted on the first flange by means of a hinge, said hinge comprising a hinge pin and a plate that is fastened to the first door and secured to said hinge pin,
   characterized in that said device includes:
   an external manual control lever secured to a rotary pin which passes through the first flange and is coupled to the hinge pin in such a way that the actuation of the control lever drives the hinge pin, thus opening or closing the first door;
   a second rotational pin coupled by drive means to the rotary pin passing through the first flange and to the hinge pin, wherein the second rotational pin is offset with respect to the rotary pin.

2. The sealed transfer device according to claim 1, characterized in that the rotary pin extends in parallel with the passage opening axis.

3. The sealed transfer device according to claim 1, characterized in that it further includes a member for locking the second flange to the first flange when the first and second doors, joined together, are in the open position, said member being provided near the hinge.

4. The sealed transfer device according to claim 1, characterized in that it further comprises a control mechanism comprising:
   a control member mounted on the first flange so as to be movable between a position for closing and a position for opening the first and the second door, the control member being located diametrically opposite the hinge,
   a first blocking member blocking said control member in the absence of the second door, and
   a second blocking member blocking said control member in the absence of the second flange associated with the second door.

5. The sealed transfer device according to claim 4, characterized in that said first blocking member is radially movable between a blocking position in which it has a peripheral end engaged in a blocking bore in said control member and a release position in which said peripheral end is disengaged from the blocking bore, said first blocking member being moved by a lug of the bayonet system of the second door.

6. The sealed transfer device according to claim 4, characterized in that the control member is secured to a rotational pin mounted through an eccentric hole provided in the second blocking member.

7. The sealed transfer device according to claim 6, characterized in that the second blocking member is radially movable between a blocking position in which the eccentric hole blocks the rotation of said control member and a release position in which the eccentric hole is moved to allow rotation of the control member, said first member being moved by a lug of the bayonet system of the second flange.

8. The sealed transfer device according to claim 4, characterized in that it further includes a member for locking the second door to the first door when the first and the second door are in the open position, said member for locking being integrated into the first door, the member for locking the second door to the first door comprising a locking finger which extends toward the passage opening and is radially movable between a position in which it is recessed within the first door and a position for locking the doors together in which it projects radially from the first door.

9. The sealed transfer device according to claim 4, characterized in that the control member is movable about an axis tangential to the circumference of said first flange, between a closing position where said member forms an angle α with the transverse plane of the flange, and an opening position where said member forms an angle β greater than α with the transverse plane and causes the coupled doors to open.

10. The sealed transfer device according to claim 1, characterized in that it further includes a member for locking the second flange to the first flange when the first and second doors, joined together, are in the open position, said member being provided near the hinge.

11. The sealed transfer device according to claim 10, characterized in that the member for locking includes an oblong hole receiving the second rotational pin on one hand, and includes a locking finger extending toward the passage opening, said locking member being translatable in a direction perpendicular to the rotational pin of the hinge, between a position in which the finger is recessed within the first flange and a position for locking the flanges together in which the finger projects radially from the first flange.

12. The sealed transfer device according to claim 1, characterized in that it further includes a member for locking the second flange to the first flange when the two-first and second-doors, joined together, are in the open position, said member being provided at the hinge.

13. The sealed transfer device according to claim 12, characterized in that the member for locking includes an oblong hole receiving the second rotational pin on one hand, and includes a locking finger extending toward the passage opening, said locking member being translatable in a direction perpendicular to the rotational pin of the hinge, between a position in which the finger is recessed within the first flange and a position for locking the flanges together in which the finger projects radially from the first flange.

* * * * *